E. W. WALTON.
Weed Cutter.
No. 105,529. 
Patented July 19, 1870.
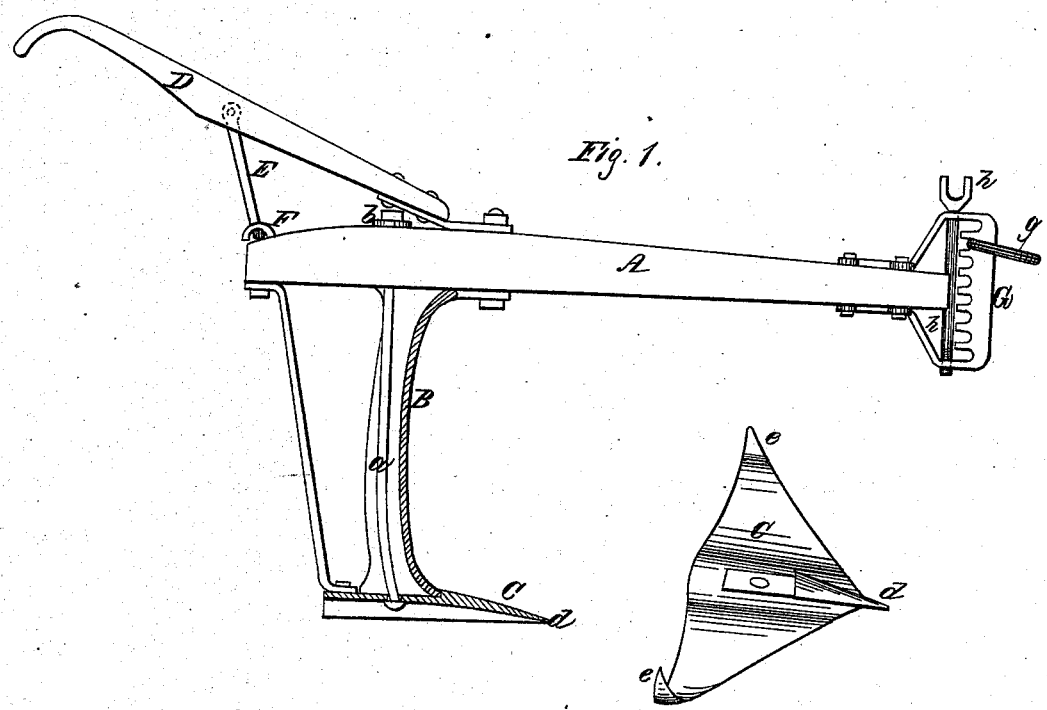
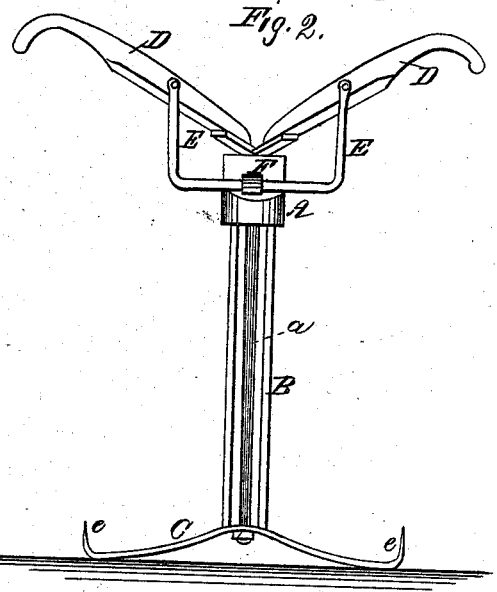
Witnesses.
Inventor.
Elisha W. Walton

UNITED STATES PATENT OFFICE.

ELISHA W. WALTON, OF SAN LEANDRO, CALIFORNIA.

IMPROVEMENT IN WEED-CUTTERS.

Specification forming part of Letters Patent No. 105,529, dated July 19, 1870.

*To all whom it may concern:*

Be it known that I, ELISHA W. WALTON, of San Leandro, county of Alameda, State of California, have invented an Improved Weed-Cutter; and I do hereby declare the following description and accompanying drawing are sufficient to enable any person skilled in the art or science to which it most nearly appertains to make and use my said invention or improvements without further invention or experiment.

My invention relates to an improved machine for cultivating the surface of the ground by cutting down the weeds and leaving them exposed to the sun, so that they cannot sprout again and grow; and it consists, first, in the form and construction of the shovel or cutter; secondly, in the manner of adjusting the handles; and, thirdly, in the peculiar manner of constructing the clevis, so as to regulate the depth it is desired to cut.

Referring to the accompanying drawing for a full description of my invention.

A represents a beam constructed similar to an ordinary plow-beam, and B a hollow standard secured to it near the rear end. To the lower end of this standard is attached a shovel, C, by means of a rod, $a$, which passes through the bottom of the cutter or shovel, and up through the hollow standard; also passing through the beam, where it is secured by a nut, $b$. By means of this device the shovel is held firmly against the lower end of the standard.

The shovel C consists of a triangular-shaped plate of metal, one of its corners having a point, $d$, extending in front of it, which serves as a share to break the ground in front of the cutter. The two side points $e$ are turned up in such a manner that they stand at an angle with any line which is parallel with the direction of travel, so that when the shovel is cutting near a row of corn or other growing vegetable a narrow line of earth upon each side of the shovel will be thrown toward the center. The shovel is bent upward from the point $d$ back to the middle of the long side, so that the halves of the triangle on each side of the standard gradually slope toward the share or cutting edges and point.

The handles D are pivoted to the beam above the standard B, and a rod, E, which has its opposite ends bent at right angles, is secured to the handles upon each side, directly above the end of the beam. This rod is caught by a clasp, F, which is secured to the end of the beam, and is slightly bent, so that the handles can be shifted from side to side, as desired, in order to avoid any standing stalks that may be near.

The clevis consists of a vertical rack-bar, G, which is secured to the front end of the plow-beam in the usual manner. This rack-bar is provided with a number of teeth, as shown, between any two of which the link $g$ may be placed. A long screw or bolt, $h$, passes down through a hole in the upper arm of the rack-bar, so as to stand directly in front of the teeth, and is secured in the arm beneath. This screw prevents the link from being moved from its place when once set, for regulating the depth it is desired to run the cutter.

This weed-cutter is employed in a manner similar to an ordinary single plow. The shovel or cutter is intended to cut but a slight depth below the surface of the ground, and thus cut and root up the weeds, when, by leaving them exposed to the sun, they will be totally destroyed.

Having thus described my invention, what I claim, and desire to secure by Letters Patent, is—

1. The triangular shovel C, constructed as described, and having the two bent ears $e$, substantially as and for the purpose herein specified.

2. The bent rod E, having its opposite ends secured to the movable handles D, in combination with the clasp F, substantially as and for the purpose described.

3. The arrangement of the bolt $h$, for retaining the link $g$ in the rack-bar of the clevis, substantially as herein set forth.

In witness whereof I have hereunto set my hand and seal.

ELISHA W. WALTON. [L. S.]

Witnesses:
E. H. DYER,
WM. GERLACH.